(No Model.) 2 Sheets—Sheet 1.
V. WEBER & J. FRIEDMAN.
CHECK ROW CORN PLANTER.
No. 298,139. Patented May 6, 1884.
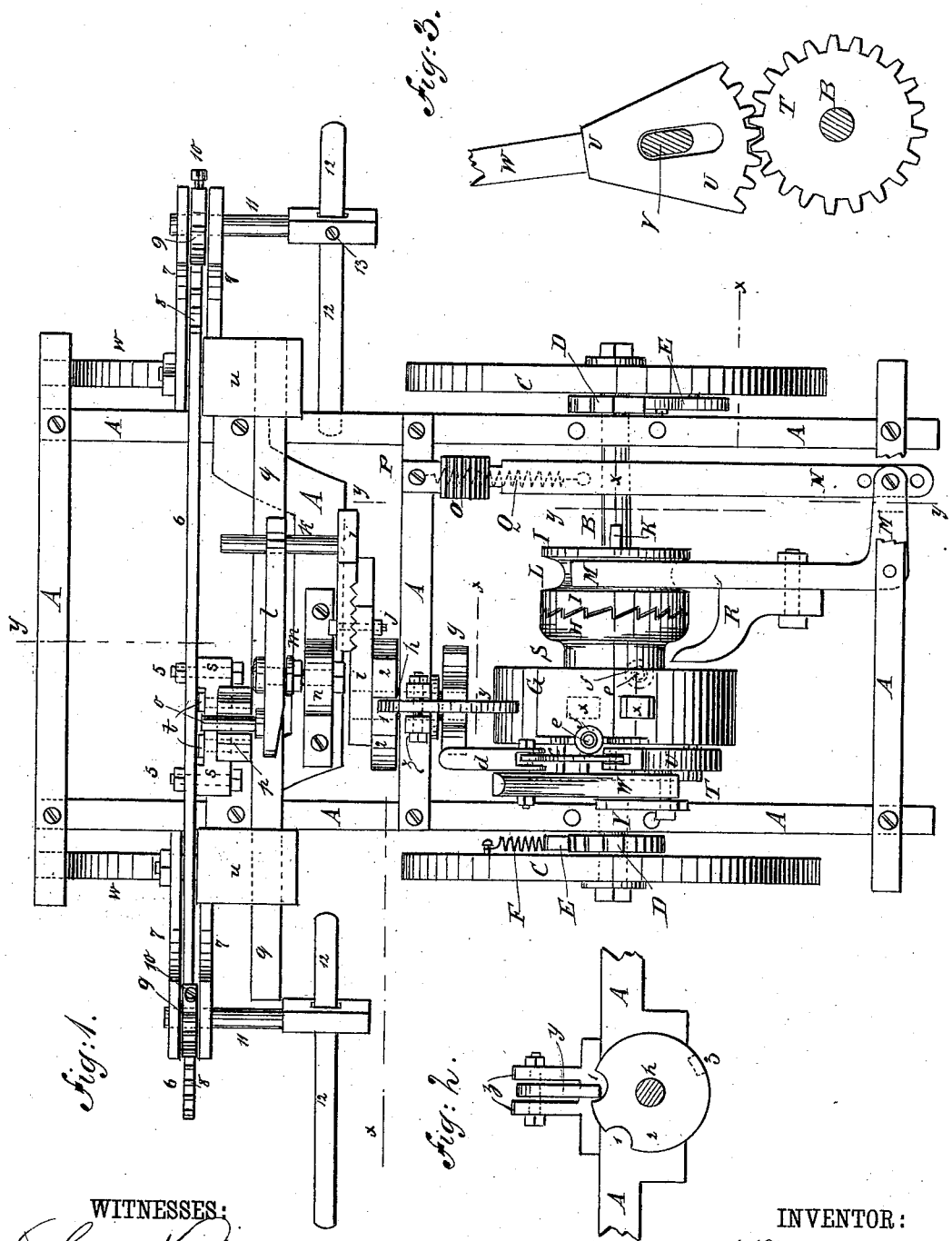
WITNESSES:
INVENTOR:
V. Weber
J. Friedman
BY
Munn & Co.
ATTORNEYS.

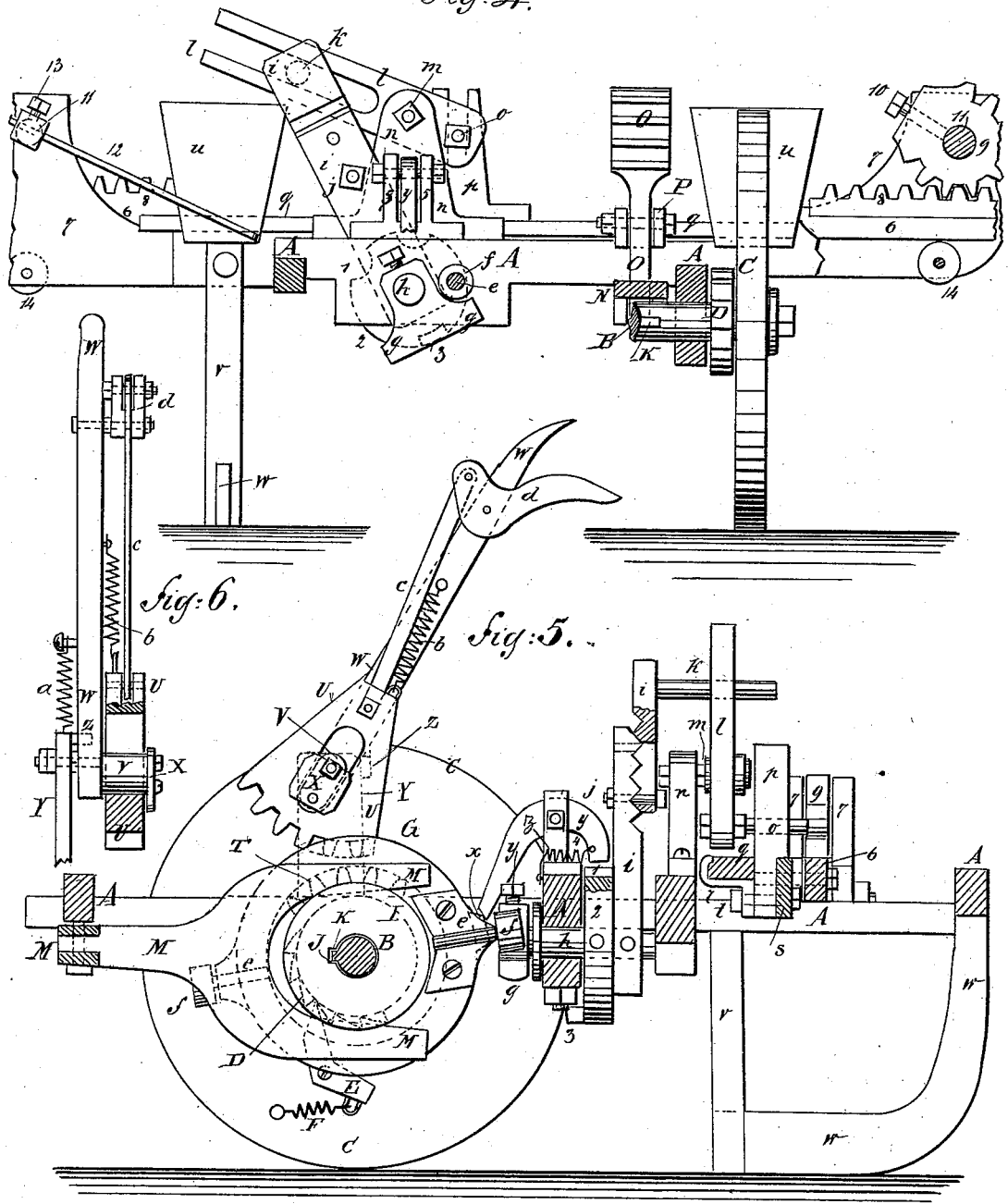

UNITED STATES PATENT OFFICE.

VALENTINE WEBER AND JOHN FRIEDMAN, OF PRINCEVILLE, ILLINOIS.

CHECK-ROW CORN-PLANTER.

SPECIFICATION forming part of Letters Patent No. 298,139, dated May 6, 1884.

Application filed December 8, 1883. (No model.)

*To all whom it may concern:*

Be it known that we, VALENTINE WEBER and JOHN FRIEDMAN, of Princeville, in the county of Peoria and State of Illinois, have invented a new and useful Improvements in Check-Row Corn-Planters, of which the following is a full, clear, and exact description.

Reference is to be had to the accompanying drawings, forming part of this specification, in which similar letters of reference indicate corresponding parts in all the figures.

Figure 1, Sheet 1, is a plan view of our improvement, part being broken away. Fig. 2, Sheet 1, is a front elevation of the lock for the seed-dropping slide-bar. Fig. 3, Sheet 1, is a side elevation of a part of the mechanism for adjusting the trip-wheel forward. Fig. 4, Sheet 2, is a sectional rear elevation of the improvement, taken through the broken line $x\,x\,x\,x$, Fig. 1. Fig. 5, Sheet 2, is a sectional side elevation of the same, taken through the broken line $y\,y\,y\,y$, Fig. 1. Fig. 6, Sheet 2, is a rear elevation, partly in section, of a part of the mechanism for adjusting the trip-wheel forward.

The object of this invention is to facilitate the planting of corn in accurate check-row, and also to promote convenience in adjusting and controlling check-row corn-planters.

The invention consists in a corn-planter constructed with the wheels and axle, and the seed-dropping slide, connected by a trip-wheel having arms and rollers operating a vibrating double cam connected with an extension-arm provided with a crank-pin and operating a slotted lever provided with a crank-pin working in a slotted standard attached to the said seed-dropping slide. The slotted standard is secured to the seed-dropping slide by a clamp and clamp-block connected with each other and the said standard by bolts.

To the trip-wheel are attached projections to operate a pawl held down by a spring and engaging with recesses in a wheel attached to the shaft that carries the vibrating cam and the extension-arm to lock the seed-dropping slide until released by the action of the trip-wheel. The trip-wheel is connected with the axle by a fixed clutch and a sliding clutch operated by a forked elbow-lever, a connecting-rod, and a spring-held foot-lever, so that the said trip-wheel can be readily thrown out of and into gear with the said axle.

To the forked lever is attached a brake-arm to engage with the rim of the fixed clutch and stop the trip-wheel when the sliding clutch is thrown out of gear.

To the trip-wheel is attached a gear-wheel, with which engages a gear-segment sliding upon a lever, and thrown into gear by a connecting-rod and elbow-lever, and out of gear by a spring, so that the said trip-wheel can be readily moved forward should it drop the seed too late.

With the seed-dropping slide is connected a cross-bar, sliding in guides and provided with rack-bars engaging with gear-wheels attached adjustably to shafts, provided with adjustable steel bars, so that the ground will be marked in line with the cross-rows, as will be fully described hereinafter.

A is the frame of the machine. B is a shaft which revolves in bearings attached to the rear part of the side bars of the frame A, and upon the projecting ends of which are placed the loose drive-wheels C. The drive-wheels C are made to carry the shaft B with them in their forward revolution by the ratchet-wheels D, attached to the said shaft B, and with the teeth of which engage the lever-pawls E, pivoted to the drive-wheels C, and held against the said ratchet-teeth by springs F, attached at one end to the said pawls and at the other end to the said drive-wheels.

Upon the shaft B is placed a loose trip-wheel, G, upon one end of the hub of which is formed, or to it is attached a clutch-wheel, H. With the teeth of the clutch-wheel H engage the teeth of the clutch-wheel I, which has a groove, J, formed in its inner surface to receive a tongue, K, attached to the shaft B, so that the said clutch-wheel will be carried around by and with the said shaft, and can be moved longitudinally upon the shaft, to throw the said clutch-wheel I into and out of gear with the clutch-wheel H.

In the clutch-wheel I is formed an annular groove, L, to receive the forked end of the elbow-lever M, which is pivoted at its angle to the rear cross-bar of the frame A, or other suitable support.

To the end of the short arm of the lever M is pivoted the rear end of the connecting-bar N, the forward end of which is pivoted to the lower end of the foot-lever O. The foot-lever O is pivoted to a support, P, attached to a cross-bar of the frame A or other suitable support, so that the driver, by operating the lever O with his foot, can throw the clutch-wheel I out of gear with the clutch-wheel H, and thus release the trip-wheel G. The bar N, when the foot-lever O is released, is drawn forward to throw the clutch-wheels I H into gear by a spiral or other-shaped spring, Q, attached to the said bar N and to the frame A, as shown in dotted lines in Fig. 1. The upper end of the foot-lever O can be rounded and roughened to prevent the driver's foot from slipping upon it. The rear end of the connecting-bar N has two or more holes formed in it to receive the pivot, so that the elbow-lever M can be adjusted to give the clutch-wheel I more or less movement and to take up the wear.

To the side of the rear part of the forward arm of the elbow-lever M is bolted the rear end of an arm, R, the forward end of which is extended outward and forward to enter an annular groove, S, forward between the trip-wheel G and the rim of the clutch-wheel H, so that when the lever M is operated to throw the clutch-wheel I out of gear, the said arm R will be pressed against the rim of the clutch-wheel H, and serve as a brake to check the motion of the trip-wheel G. With this construction, by operating the lever O, the clutch-wheel I will be thrown out of gear to prevent the seed-dropping mechanism from being operated while the machine is being turned around and being drawn from place to place. With this construction, also, the driver can stop the operation of the seed-dropping mechanism, should the seed be dropped too soon, so that the hills will be dropped in line with the cross-rows.

To the side of the trip-wheels G, opposite the clutch-wheels H I, is rigidly attached a gear-wheel, T, into the teeth of which mesh the teeth of the gear-segment U. The gear-segment U is slotted radially to receive and slide upon a flattened stud or projection, V, formed upon or rigidly attached to the side of the lower part of the lever W. The segment U is kept in place upon the stud V by a cap-plate, X, attached to the outer end of the said stud, and which overlaps the outer side of the said segment. The lower end of the lever W is pivoted to a standard, Y, attached to the frame A, and its forward movement is limited by an arm or projection, Z, formed upon or attached to the upper end of the forward side of the said standard. The lever W is held forward by a spiral or other shaped spring, $a$, the upper end of which is attached to the said lever W, and its lower end is attached to the forward side of the standard Y. The segment U is held up out of gear with the gear-wheel T by a spiral or other shaped spring, $b$, attached at its lower end to the upper end of the said segment, and at its upper end to the lever W.

To the upper end of the segment U is pivoted the lower end of a connecting-rod, $c$, the upper end of which is pivoted to the end of a small elbow-lever, $d$. The lever $d$ is pivoted at its angle to the upper part of the lever W, so that the upper ends of the two levers W $d$ can be grasped at the same time by the same hand. With this construction, should the seed be dropped too late, the driver, by operating the lever $d$, throws the segment U into gear with the gear-wheel T, and by moving the lever W to the rearward, he turns the trip-wheel G forward, so that the seed will be dropped in line with the cross-rows.

To the opposite sides of the trip-wheel G and at the opposite sides of the rim of the said wheel, as shown in full and dotted lines in Figs. 1 and 5, are attached short arms $e$, to the outer ends of which are pivoted rollers $f$, so that as the wheel G is revolved the said rollers will strike the opposite sides of the cam $g$, placed upon the rear end of the shaft $h$, and vibrate the said cam, giving a reciprocating rotary movement to the said shaft. The cam $g$ is secured to the shaft $h$ by a set-screw, and its sides are curved outward, as shown in Fig. 4, to cause the rollers $f$ to give the necessary amount of movement to the said cam and its shaft. The shaft $h$ revolves in bearings attached to cross-bars of the frame A, and to its forward part is rigidly attached the lower end of an upwardly-projecting arm, $i$. The arm $i$ is made in two parts, the adjacent ends of which overlap each other, are correspondingly corrugated upon their adjacent sides, and are secured to each other by a bolt, $j$, so that the said arm can be lengthened and shortened to give a longer or shorter stroke to the seed-dropping slide. The lower section of the arm $i$ has two or more holes formed in it to receive the bolt $j$, and the upper section has a slot formed in it to receive the said bolt, so that the said sections can be readily adjusted.

To the upper end of the extension-arm $i$ is attached a forwardly-projecting pin, $k$, which passes through a slot in the upper part of the lever $l$. The lever $l$ is pivoted by a bolt, $m$, to the upper end of a standard, $n$, attached to a cross-bar of the frame A.

To the lower end of the lever $l$ is attached a forwardly-projecting pin, $o$, which passes through a slot in the arm $p$. The lower part of the slotted arm $p$ is secured to the forward edge of the seed-dropping slide $q$ by the clamp $r$, the clamping-block $s$, and the bolts $t$, the said bolts passing through the lower part of the clamp $r$, the lower ends of the slotted arm $p$, and the clamping-block $s$. The upper part of the clamp $r$ is made in hook form, so as to clasp the rear edge of the seed-dropping slide $q$, so that the said seed-dropping slide will be operated by the vibration of the lever $l$. The end parts of the slide $q$ pass through the lower parts of the seed-boxes $u$, so as to receive seed from the said seed-boxes and drop it through the seed-conducting spouts $v$ to the ground. The upper ends of the spouts $v$ are attached to the projecting ends of a cross-bar of the frame A, and their lower ends are attached to the rear ends of the runners $w$, the forward ends of which are attached to the projecting ends of the forward cross-bar of the frame A.

To the face of the trip-wheel G, a little in the rear of each arm $e$, is attached a projection, $x$, to strike against the rear end of the locking-pawl $y$, which is pivoted to a slotted standard, $z$, attached to a cross-bar of the frame A. The forward end of the pawl $y$ is curved downward, so as to engage with one or the other of the two recesses 1, formed in the rim of the wheel 2 in such positions as to receive the engaging end of the said pawl $y$ at each end of the stroke of the seed-dropping slide $q$, and lock the seed-dropping mechanism in place until again released by the operation of the trip-wheel G.

To the lower side of the locking-wheel 2 is attached a projection or arm, 3, which projects beneath the cross-bar of the frame A, so as to come in contact with the lower side of the said cross-bar, and thus stop the said wheel 2 in such a position that the engaging end of the pawl $y$ will enter one or the other of the recesses 1. The forward end of the pawl $y$ is held down against the rim of the wheel 2, so as to enter the recesses 1 of the said wheel by a spiral or other spring, 4, attached to the said end and to the standard $z$, or the cross-bar of the frame A.

To the clamping-block $s$ is secured by bolts 5 the middle part of the cross-bar 6, which is made longer than the width of the frame A, and its end parts extend through grooves in the upper parts of the guides 7, and have rack-bars 8, formed upon or attached to their upper sides. The inner ends of the guides 7 are bolted to the forward sides of the projecting ends of the cross-bar of the frame A, that carries the seed-boxes $u$, or some other suitable support. Within the grooved upwardly-projecting outer parts of the guides 7 are placed gear-wheels 9, the teeth of which mesh into the teeth of the rack-bars 8, and which are secured by set-screws 10 to the shafts 11, which pass through them and through bearings in the said upper parts of the guides 7. The rear parts of the shafts 11 are slotted to receive the steel bars 12, which are secured to the said shafts 11 by set-screws 13. The outer parts of the cross-bar 6 rest upon small rollers 14 pivoted in the lower outer parts of the grooves in the guides 7 to lessen the friction, and thus cause the said bar to move easily. With this construction, by loosening the set-screws 13 the steel bars 12 can be so adjusted that their lower ends will strike and mark the surface of the ground as the said bars are vibrated by the reciprocating movement of the bar 6, and by loosening the set-screws 10 the shafts 11 can be so adjusted that the bars 12 will mark the ground in line with the cross-rows and at a distance from the last hill equal to half the distance apart of the rows, so that, by so driving the machine in crossing the field that the marks made by the inner bar 12 will coincide with the marks made by the outer bar 12 at the previous crossing, the rows will all be at equal distances apart.

Having thus described our invention, we claim as new and desire to secure by Letters Patent—

1. In a corn-planter, the combination, with the wheels and axle C B and the seed-dropping slide $q$, of the trip-wheel G, having arms and rollers $e$ $f$, the vibrating double cam $g$, shaft $h$, arm $i$, having crank-pin $k$, the slotted lever $l$, pivoted to the standard $n$, and having crank-pin $o$, and the slotted standard $p$, substantially as herein shown and described, whereby the said seed-dropping slide will be operated from the said wheels and axle, as set forth.

2. In a corn-planter, the combination of the seed-dropping slide, the trip-wheel G, having projections $x$, and the arms and rollers $e$ $f$, the vibrating double cam $g$, shaft $h$, having arm $i$, provided with crank-pin $k$, the slotted lever $l$, having crank-pin $o$, slotted standard $p$, the spring-pawl $y$, and the recessed wheel 2, substantially as and for the purpose set forth.

3. In a corn-planter, the combination, with the trip-wheel G and the shaft $h$, carrying the vibrating cam $g$ and the arm $i$, of the projections $x$, the locking-pawl $y$, the spring $z$, and the wheel 2, having recesses 1, substantially as herein shown and described, whereby the seed-dropping slide will be locked until released by the action of the trip-wheel, as set forth.

4. In a corn-planter, the combination, with the axle B and the trip-wheel G, of the fixed clutch-wheel H, the sliding clutch-wheel I, the forked elbow-lever M, the connecting-bar N, the foot-lever O, and the spring Q, substantially as herein shown and described, whereby the said trip-wheel can be readily thrown out of and into gear with the said axle, as set forth.

5. In a corn-planter, the combination, with the trip-wheel G, the fixed clutch-wheel H, having groove S and the forked clutch-lever M, of the brake-arm R, substantially as herein shown and described, whereby the outward movement of the said lever will stop the movement of the said trip-wheel, as set forth.

6. In a corn-planter, the combination, with the seed-dropping slide $q$ and the grooved guides 7, of the cross-bar 6, the gear-wheels 9, the adjustable shafts 11, and the adjustable bars 12, substantially as herein shown and described.

7. In a corn-planter, the combination of the dropping-slide having the slotted standard $p$, the clamp 3, with its bolts $t$ and 5, rack-bar 6, shafts 11, having pinions 9 and markers 12, the trip-wheel G, having arms and rollers $e$ $f$, shaft $h$, carrying the vibrating double cam $g$, and arm $i$, having the crank-pin $k$, and slotted lever $t$, pivoted upon the standard $n$, and having a crank-pin, $o$, entering the slotted standard $p$, substantially as and for the purpose set forth.

VALENTINE WEBER.
JOHN FRIEDMAN.

Witnesses:
JOSEPH FRIEDMAN,
FRANK A. WEBER.